R. P. VAN CALCAR, J. ELLERMANN & H. J. MARTIJN.
DEVICE FOR DRYING AND STERILIZING AIR.
APPLICATION FILED DEC. 29, 1911.

1,067,693.

Patented July 15, 1913.

2 SHEETS—SHEET 1.

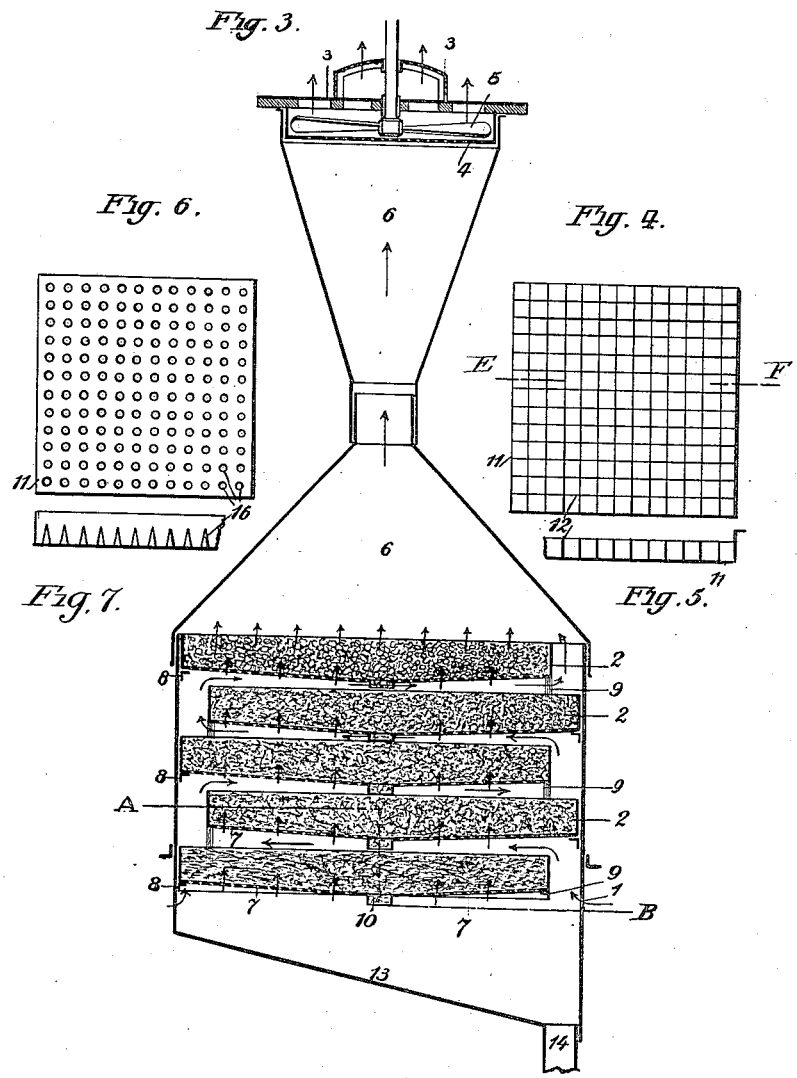

UNITED STATES PATENT OFFICE.

REINDER PIETERS VAN CALCAR, OF OEGSTGEEST, AND JAN ELLERMANN AND HENDRIKUS JOHANNES MARTIJN, OF THE HAGUE, NETHERLANDS.

DEVICE FOR DRYING AND STERILIZING AIR.

1,067,693.  Specification of Letters Patent.  Patented July 15, 1913.

Application filed December 29, 1911. Serial No. 668,475.

*To all whom it may concern:*

Be it known that we, REINDER PIETERS VAN CALCAR, professor, JAN ELLERMANN, banker, and HENDRIKUS JOHANNES MARTIJN, banker, residing the former in the city of Oegstgeest and the latter two in the city of The Hague, in the Kingdom of the Netherlands, have invented certain new and useful Improvements in Devices for Drying and Sterilizing Air, of which the following is a specification.

It is important in many cases to have in closed rooms completely dry and as far as possible completely sterilized air and to be able to produce this as it is required. By the known apparatus hitherto used for this purpose the desired object is not attained inasmuch as the aqueous vapor and impurities in air are not separated from it at all, or only to a very slight extent. The contrary result is really achieved as by heating the capacity of air to take up aqueous vapor is merely increased and by ventilation the air saturated with aqueous vapor is certainly removed but only to be replaced by damp, fresh air. The sterilizing of air in closed rooms has not hitherto been attempted.

The object of the present invention is to obviate these defects by subjecting the air in closed rooms with means for preventing the ingress of fresh atmospheric air to such treatment in an apparatus mounted in the closed room itself that the air is freed from all aqueous vapor and impurities and a completely dry and pure air is produced.

The invention consists in the novel features of construction hereinafter described, pointed out in the claims and shown in the accompanying drawings, in which—

Figure 1:
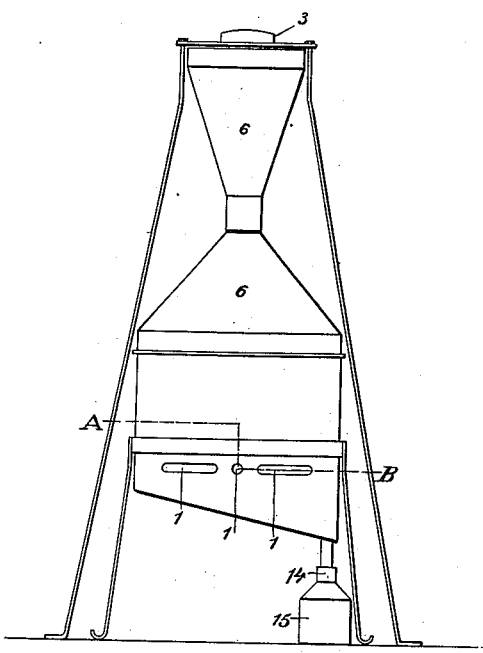
Figure 2:
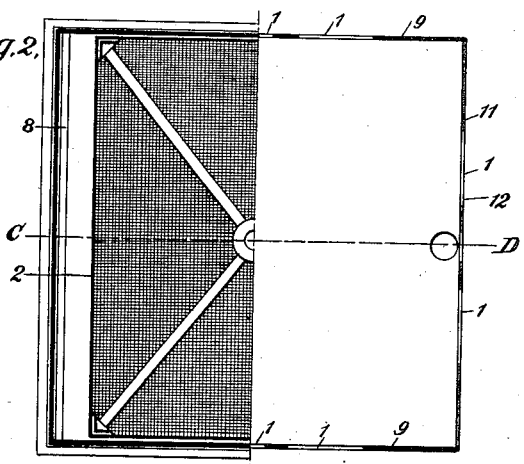

Figure 1 gives a side view of the apparatus. Fig. 2 a horizontal section along the line A—B in Fig. 3. Fig. 3 a vertical section along the line C—D in Fig. 2. Fig. 4 a top view of the evaporating pan. Fig. 5 a vertical section along the line E—F in Fig. 4. Fig. 6 shows in plan a modified form of the evaporating pan; and Fig. 7 shows in vertical transverse section the modified form of evaporating pan illustrated in Fig. 6 in plan.

The damp air enters the apparatus through the openings 1. The air current may if desired be strengthened by means of a ventilating fan 5 which may be driven by a motor or by any other means. The current of air passes through and over the pans 2, filled with suitable absorbent material (for example calcium chlorid) in the direction of the arrows (Fig. 3). In this way moisture and impurities are separated from the air, and the dry and sterilized air current passes out from the apparatus through the cover 3 which consists of perforated sheet-metal. This cover or lid 3 is on its underside provided with a wire gauze disk below the ventilating fan so that any particles of calcium chlorid which may be carried along by the air current strike against this disk and then fall back again into the pans through the funnel shaped chamber 6. These pans 2 are so arranged in the apparatus that the air current is compelled to pass through the apparatus in a staggered course whereby the air is brought into contact with the absorption medium (calcium chlorid) for as long an extent as possible. With this end in view the pans are arranged opposite to each other and on the one side are supported by angle-irons 8 applied to the wall while on the opposite side they are supported by uprights 9 arranged on the next pan below so that on this side they do not quite reach the wall but a passage is left for the air-current which passes by the side of the pan not composed of wire gauze. The lowest pan is supported on three sides by angle irons 8 secured to the wall.

The pans are provided with sloping perforated or gauze bottoms 7 dished toward the middle and preferably made of wire gauze; so that on the one hand the air passing through the pan by this bottom must penetrate the whole of the absorbing material (calcium chlorid) whereby a very energetic drying and purifying effect is produced and on the other hand the solution of the absorbing material (calcium chlorid) which is formed falls on the pans which lie below. For this purpose an outlet pipe 10 is further provided in the middle of each pan. After the solution has in this way left the lowest pan it reaches the chamber 13 below, whence it is led off by the pipe 14 and collected in a suitable receiver 15. This receiver is emptied, when necessary, outside the room in which the apparatus for drying and purifying the air is set up into an evaporating pan 11. When calcium chlorid is used as the absorbing material it is preferably mixed with sodium sulfate and copper sulfate before evaporation and after evaporation is suitable for renewed use. When calcium chlorid is used, to prevent it from setting or caking when the solution is evaporated, the bottom of the evaporating pan is preferably constructed in the manner shown in Fig. 4, sub-divided by partition walls 12, or as shown in Fig. 6, provided with points 16 so that a special granulation of the drying material is not necessary.

In order to facilitate a more intensified and rapid suction of the dried and sterilized air the apparatus is narrowed above the pans, so that here it has the form of two abutting truncated cones, and in the cover a mechanically driven exhaust fan is arranged which still further increases the suction.

What we claim is:—

1. An apparatus for drying and sterilizing air in closed rooms consisting of a vessel having at the top the shape of a double funnel and closed at the bottom by a sloping floor with an outlet, of pans provided with foraminated bottoms and filled with granulated calcium chlorid or the like, and of an exhaust fan arranged in the upper part of said vessel, for accelerating the passage of the air, substantially as set forth.

2. An apparatus for drying and sterilizing the air in closed rooms, consisting of a vessel having at the top the shape of a double funnel and closed at the bottom by a sloping floor with an outlet, the lateral wall of said vessel being provided with pan supporting devices of pans provided with foraminated bottoms, said pans being arranged in such a manner that one pan lies under the other extends with one side to said wall of the vessel and is supported by said devices, an exhaust fan arranged in the upper part of said vessel, substantially as described.

3. An apparatus for drying and sterilizing the air in closed rooms, comprising a vessel having its upper portion narrowed between its upper and lower ends and provided with a cover, said vessel having in its lower portion a sloping floor formed with an outlet; pans arranged in staggered relation one above the other within said vessel and filled with a suitable soluble absorbent material; and an exhaust fan mounted in said cover for accelerating the flow of the air to be dried.

In testimony whereof we have affixed our signatures in presence of two witnesses.

REINDER PIETERS VAN CALCAR.
JAN ELLERMANN.
HENDRIKUS JOHANNES MARTIJN.

Witnesses:
I. I. HELSDON RIX,
EDWARD C. SPERRY.